Oct. 29, 1940.  E. E. MEIER  2,219,845

GUIDING OF BLANKS FIXED AT BOTH ENDS IN MACHINE TOOLS

Filed April 22, 1938

Inventor:

ERNST EMIL MEIER

By Young, Emery + Thompson

Attorneys

Patented Oct. 29, 1940

2,219,845

UNITED STATES PATENT OFFICE 2,219,845

GUIDING OF BLANKS FIXED AT BOTH ENDS IN MACHINE TOOLS

Ernst Emil Meier, Oberndorf-on-the-Neckar, Wurtemberg, Germany, assignor to Mauser-Werke A.-G., Oberndorf-on-the-Neckar, Germany, a joint stock company of Germany Application April 22, 1938, Serial No. 203,703
In Germany April 26, 1937

7 Claims. (Cl. 82—2)

For ensuring exact work, it is demanded from all machine tools that the mounting and guiding of the work or blank should be uninfluenced during machining by the mounting and guiding of the tool. It is usual to arrange the guide means for permitting feed motion of the tool or the blank at a substantial distance from the axis of rotation of the blank. The forces produced during the machining of the blank tend therefore to tilt the blank or the tool about the guiding abutment, which interferes with the accuracy of the work.

The invention provides a reliable guiding as it proposes to make the machine part connecting together the tail-stock and the head-stock, into a hollow apertured body, and to arrange within the same, preferably in its central axis, the axis of the blank. The result of this is that the point of working of the tool is always at the same distance from the blank. It is then possible to use a common driving gear for all the movements to be effected by the blank, thus avoiding all intermediate gears.

Further details of the invention will be seen from the description and drawing of a construction given by way of example, and from the claims.

Figure 1:
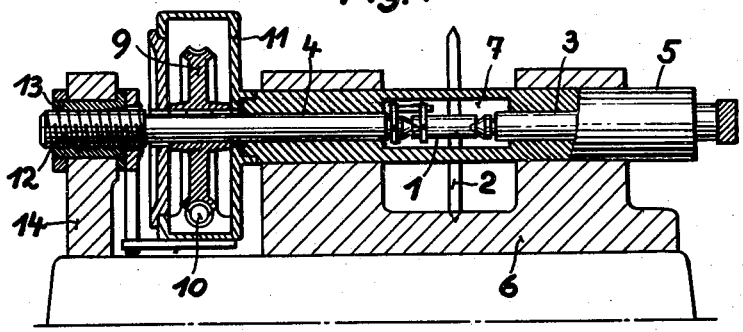
Figure 1 is a vertical longitudinal section through the new machine tool.
Figure 2:
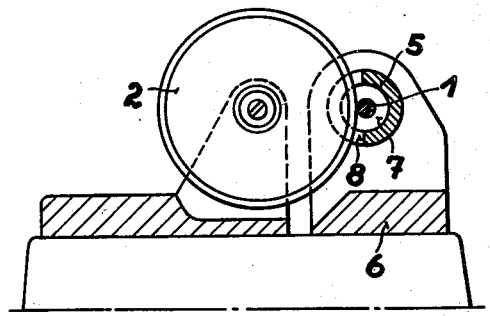
Figures 2 and 3 show the machining of a blank by means of a grinding disc or by means of a turning tool.
Figure 3:
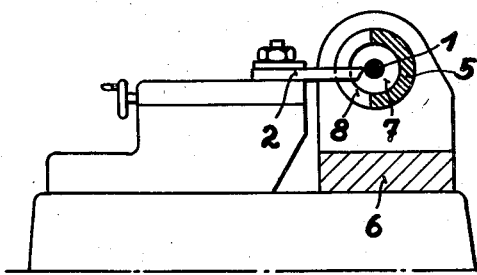

The work or blank 1 which is machined by the tool 2, is fixed between the centres of the tail-stock 3 and of the head-stock spindle 4. The tail-stock 3 and the head-stock spindle 4 are arranged in a common part or guide in the form of a tube with plain cylindrical inner and outer surfaces 5. This part 5 is guided as a carriage or slide of the blank 1 in the machine bed 6 and is as such made cylindrical, the central axis coinciding with the axis of rotation of the head-stock. Between the tail-stock 3 and the head-stock spindle 4, the part 5 comprises a free space 7 for receiving the blank 1, and a recess 8 for bringing the tool against the blank. The head-stock spindle 4 is driven by means of the worm wheel or gear 9 which meshes with the worm 10. The driving casing 11 is secured against rotation in any desired manner. In place of the wheel gearing a belt drive or an electric motor may be provided. The longitudinal or traversing motion is imparted to the head-stock according to Figure 1 by means of the screwthread 12 cut on its left hand end, and by means of the corresponding screw-threaded sleeve 13 which is secured in a bracket 14 against rotation and shifting. The mounting of the feedgear as well as the mounting of the tool are connected to the machine bed 6 so as to be free from vibrations.

Instead of by the screwthread 12, the feed of the head-stock spindle 4 could be obtained by means of toothed racks, cams or the like, with mechanical, hydraulic or pneumatic drive. In the same way, for the purpose of obtaining a variable feed, the gear part 12 may be separated from the head-stock spindle 4 and moved in a different manner from that shown in Figure 1, by the main drive or by a drive of its own.

For the purpose of simultaneous machining of several blanks, several, preferably concentric round guides are combined to one machine tool, preferably with a common main drive. If the axial motion is to be made by the tool, the latter should also be provided with a corresponding round guide.

Having now particularly described and ascertained the nature of my said invention, and in what manner the same is to be performed, I declare that what I claim is:

1. A machine tool comprising a head stock spindle, a tail stock, said spindle and tail stock being adapted to receive a blank to be machined and a guide in the form of a tube with plain cylindrical inner and outer surfaces interconnecting the spindle and the tail stock and having a free space therein adjacent the inner ends of the spindle and the tail stock to receive the blank and move the blank in the axial direction.

2. A machine tool according to claim 1, in which means are provided for imparting a rotary movement in addition to an axial movement to the blank in the free space.

3. A machine tool according to claim 1, in which members are provided for moving the head stock spindle axially.

4. A machine tool according to claim 1, in which members are provided for moving the head stock spindle axially, and in which means are provided for imparting a rotary movement to the blank within the free space.

5. A machine tool comprising a head stock spindle, a tail stock, said spindle and tail stock being adapted to receive a blank to be machined, a guide in the form of a tube with plain cylindrical inner and outer surfaces interconnecting the spindle and the tail stock and having a free space therein adjacent the inner ends of the spindle and the tail stock to receive the blank and move the blank in the axial direction, means for imparting a rotary movement to the blank within the free space, and a single drive for the rotary motion of the blank and the axial movement.

6. A machine tool for the simultaneous machining of several blanks comprising a plurality of head stock spindles and tail stocks for fixing a blank at both ends, and a plurality of guides for axially guiding the blank each guide interconnecting the spindle and its tail stock and having a free space therein adjacent the inner ends of the spindle and the tail stock to receive the blank and move blank in the axial direction, each guide being in the form of a tube with plain cylindrical inner and outer surfaces.

7. A machine tool according to claim 6, in which means are provided for imparting a rotary movement to each blank within each of the free spaces and in which a single drive is provided for the rotary motion of the blanks and the axial movement.

ERNST EMIL MEIER.